(12) United States Patent
Uchida et al.

(10) Patent No.: US 7,180,983 B2
(45) Date of Patent: Feb. 20, 2007

(54) GUIDANCE INFORMATION NOTIFICATION APPARATUS IN COMMUNICATION NETWORK SYSTEM, COMMUNICATION NETWORK SYSTEM AND GUIDANCE INFORMATION NOTIFICATION METHOD

(75) Inventors: Motoyuki Uchida, Yokosuka (JP); Yasutaka Urakawa, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 234 days.

(21) Appl. No.: 10/775,152

(22) Filed: Feb. 11, 2004

(65) Prior Publication Data
US 2004/0242188 A1 Dec. 2, 2004

(30) Foreign Application Priority Data
Feb. 25, 2003 (JP) ............................. 2003-048039

(51) Int. Cl.
*H04M 1/64* (2006.01)
(52) U.S. Cl. ............................. 379/88.06; 379/88.13; 379/88.19; 379/207.14
(58) Field of Classification Search ............. 379/88.06
See application file for complete search history.

(56) References Cited

U.S. PATENT DOCUMENTS

| 5,440,615 | A | * | 8/1995 | Caccuro et al. | .......... 379/88.06 |
| 5,878,124 | A | * | 3/1999 | Griesmer et al. | ...... 379/357.01 |
| 6,069,939 | A | * | 5/2000 | Fung et al. | ................ 379/67.1 |
| 6,259,914 | B1 | | 7/2001 | Koster | |

FOREIGN PATENT DOCUMENTS

| EP | 0886424 | 12/1998 |
| JP | 08116572 A | 5/1996 |
| JP | 11313381 A | 11/1999 |
| JP | 2000216892 A | 8/2000 |
| WO | WO 98/23111 | 5/1998 |

OTHER PUBLICATIONS

Zhipeng Zhang et al., "Effects of Tree-Structure Clustering in Noise Adaptation Using Piecewise Linear Transformation", 2002 Autumn Meeting of the Acoustical Society of Japan, pp. 29-30.

(Continued)

*Primary Examiner*—Fan Tsang
*Assistant Examiner*—Simon Sing
(74) *Attorney, Agent, or Firm*—Crowell & Moring LLP

(57) ABSTRACT

There is provided a guidance information notification apparatus in a communication network system which enables improvement of convenience to a user by dispensing with a particular operation other than a normal origination operation required when a user obtains a guidance message in an understandable language such as a native language, with a terminal unit, and by enabling the user to receive support from a communication operator of the user's contract network even when a roaming service is provided. If an originator inputs a destination telephone number with a normal origination operation at a mobile telephone set 18, a guidance information notification apparatus 22-1 notifies guidance message information in a language associated with the origination telephone number to the origination mobile telephone set 18. Similarly, a guidance information notification apparatus 22-2 notifies guidance message information in the language associated with the destination telephone number to the destination fixed telephone set 20. Furthermore, a direction to process guidance message information is received from a switchboard 12 or 14, and the guidance message information is notified to the telephone set 18 or 20 in response to this direction.

9 Claims, 9 Drawing Sheets

OTHER PUBLICATIONS

Sadaoki Furui, "Cepstral Analysis Technique for Automatic Speaker Verification", IEEE Transactions on Acoustics, Speech, and Signal Processing, Apr. 1991, pp. 254-272, vol. ASSP-29, No. 2, IEEE.

Seiich Nakagawa, "Speech Recognition with Probabilistic Model", 1988, Institute of Electronics, Information, and Communication Engineers, pp. 50-67.

M.J.F. Gales et al., "Mean and Variance Adaptation within the MLLR Framework", Computer Speech and Language, 1996, pp. 249-264, 1996 Academic Press Limited.

Sugamura et al., "Speaker Independent Recognition of Isolated Words Based on Multiple Reference Templates in SPLIT System", Speech Committee Document, 1982, S82-64.

* cited by examiner

GUIDANCE INFORMATION NOTIFICATION APPARATUS IN COMMUNICATION NETWORK SYSTEM, COMMUNICATION NETWORK SYSTEM AND GUIDANCE INFORMATION NOTIFICATION METHOD

BACKGROUND OF THE INVENTION

1. Field of the Invention

The present invention relates to a guidance information notification apparatus in a communication network system such as a mobile communication network system and a general telephone network system, a communication network system and a guidance information notification method, and in particular to a guidance information notification apparatus in a communication network system, for notifying a guidance message in a native language understandable to an originator in a communication service to a fixed telephone set or a mobile telephone set, a communication network system and a guidance information notification method.

2. Description of the Related Art

Traditionally, it is a common service to announce a guidance message to a fixed telephone set or a mobile telephone set in a communication service, and a predetermined message is announced in a voice. For example, if a destination number is not used, a stereotyped message is announced in a voice, such as "The number you have reached is not in service."

Prior-art guidance information notification apparatus of this type includes, for example, those described in the Patent Documents 1 to 4 described later.

The Patent Document 1 discloses the following. Various guidance announcement information (guidance messages) in the language or phrases understandable to a user is stored in a database on the communication network, and a guidance announcement corresponding to user information is sent to a car telephone set from this database. Furthermore, a guidance announcement is selectively switched for a car telephone set according to user information.

The Patent Document 2 discloses the following. When a particular number is dialed from a mobile telephone set, a switch apparatus changes the contents of priority language information (guidance message) associated with the particular number in a database. Thus, the language used for the guidance service can be changed from a mobile telephone since the priority language information corresponds to a talkie apparatus for announcing guidance in the language.

The Patent Document 3 discloses the following. When a user calls a base station using a wireless communication terminal unit, the base station sends general guidance information (guidance message) stored in a storage circuit to the terminal unit as a voice signal in response to the call signal. The user listens to the general guidance and selects a desired information item using a keyboard switch on the terminal unit. The base station then sends information for the selected item. The user listens to the information, and if there is another item to be selected, he repeats the above procedure again to obtain desired information.

The Patent Document 4 discloses the following. When an originator inputs a selection signal for selecting an announcement (guidance message) in a desired language by operating keys on a telephone set, an announcement corresponding to the selection signal is selected from announcements in multiple kinds of pre-registered languages and sent. Thus, any originator can easily receive a paging service in a desired language.

(Patent Document 1)
Japanese Patent Laid-Open No. 8-116572 (Summary)

(Patent Document 2)
Japanese Patent Laid-Open No. 2000-216892 (Summary)

(Patent Document 3)
Japanese Patent Laid-Open No. 11-313381 (Summary)

(Patent Document 4)
Japanese Patent Laid-Open No. 8-289024 (Advantages of the Invention)

In the disclosure in the above Patent Document 1, however, a user must obtain guidance message information from a database with a particular user operation other than a normal origination operation and select a desired guidance message from the obtained information with a user operation.

In the disclosure in the above Patent Document 2, a user must obtain a desired guidance message by changing the contents of a guidance message in a database with a particular number to be specified by a user operation from a mobile telephone.

In the disclosure in the above Patent Document 3, a user must listen to general guidance and select a desired guidance item with a user operation. If there is another item to be selected, the user must select it again.

In the disclosure in the Patent Document 4, an originator must select a desired guidance message from multiple kinds of pre-registered guidance messages with a selection by a user operation.

That is, in the disclosure of any of the Patent Documents 1 to 4, a particular operation other than a normal origination operation is required from a user when he is notified of a guidance message in an understandable language, such as a native language, with a terminal unit. This is inconvenient to the user.

In the communication system according to any of the above Patent Documents 1 to 4, it is possible to make a call in multiple countries with the same telephone set through a roaming service. However, when a roaming service is provided, a call is made not via the network with which the user is under contract, and therefore the communication operator of the contract network is not involved. Therefore, the user cannot receive support from the communication operator when he is notified of the guidance message. This is inconvenient to the user.

The present invention has been made in consideration of these problems, and its object is to provide a guidance information notification apparatus in a communication network system, the apparatus enabling improvement of convenience to a user by dispensing with a particular operation other than a normal origination operation required when a user is notified of a guidance message with a terminal unit in an understandable language such as a native language and by enabling the user to receive support from a communication operator of the user s contract network even when a roaming service is provided, a communication network system and a guidance information notification method.

SUMMARY OF THE INVENTION

In order to achieve the above object, the guidance information notification apparatus in a communication network system, according to claim 1 of the present invention, is a guidance information notification apparatus in a communication network system, for notifying guidance information to at least one of origination and destination terminal units having a telephone function via a switchboard; the guidance information notification apparatus comprising: acquisition means for acquiring at least one of origination and destination telephone numbers from the switchboard; conversion means for, with the use of a first country code with which at least one language used in a country or a country district can be identified, converting the acquired telephone number into the first country code based on the correspondence relationship between a telephone number pre-associated with the first country code and the acquired telephone number; a database in which the first country code is stored in association with guidance information in the language; selection means for selecting from the database the guidance information associated with the first country code which has been converted by the conversion means; and notification means for notifying the guidance information selected by the selection means to the terminal unit via the switchboard.

According to this configuration, if an originator inputs a destination telephone number with a normal origination operation at a terminal unit, guidance information in the language understandable to the originator which is associated with the origination telephone number via a country code is notified to the origination terminal unit. At the same time, guidance information in the language understandable to the recipient which is associated with the destination telephone number via a country code is also notified to the destination terminal unit.

The guidance information notification apparatus in a communication network system, according to claim 2 of the present invention, is a guidance information notification apparatus in a communication network system, for notifying guidance information to at least one of origination and destination terminal units having a telephone function via a switchboard; the guidance information notification apparatus comprising: acquisition means for acquiring at least one of origination and destination telephone numbers from the switchboard; conversion means for, with the use of a second country code with which the language used in the area where a switchboard managing at least one of the origination and destination telephone numbers is installed can be identified, converting the acquired telephone number into the second country code based on the correspondence relationship between a telephone number pre-associated with the second country code and the acquired telephone number; a database in which the second country code is stored in association with guidance information in the language; selection means for selecting from the database the guidance information associated with the second country code which has been converted by the conversion means; and notification means for notifying the guidance information selected by the selection means to the terminal unit via the switchboard.

According to this configuration, if an originator inputs a destination telephone number with a normal origination operation at a terminal unit, guidance information in the language understandable to the originator which is associated with the origination telephone number via a country code is notified to the origination terminal unit. At the same time, guidance information in the language understandable to the recipient which is associated with the destination telephone number via a country code is also notified to the destination terminal unit.

The guidance information notification apparatus in a communication network system according to claim 3 of the present invention is the guidance information notification apparatus according to claim 1 or 2; comprising: setting means for receiving information which directs processing of the guidance information via the switchboard and setting the direction; wherein the notification means notifies the guidance information selected by the selection means to the terminal unit in response to the set direction.

According to this configuration, if a communication operator sends information which directs processing of guidance information to a switchboard, the guidance information can be notified to a terminal unit while the processing is performed in accordance with the direction. For example, if the order of notification of guidance information is directed, the guidance information is notified to a terminal unit in the order of notification. The direction may be a code to be sent to a switchboard not only by a communication operator but also by a user via the Internet.

The communication network system according to claim 4 of the present invention is a communication network system provided with a guidance information notification apparatus for notifying guidance information to at least one of origination and destination terminal units having a telephone function via a switchboard; wherein the terminal unit comprises: storage means for storing an origination country code corresponding to the language understandable to the owner of the origination terminal unit; and sending means for sending the origination country code stored in the storage means when a destination telephone number is sent from the origination terminal unit; and the guidance information notification apparatus comprises: first acquisition means for acquiring the origination country code from the origination terminal unit via the switchboard; second acquisition means for acquiring the destination telephone number from the switchboard; conversion means for, with the use of a destination country code with which at least one language used in a country or a country district can be identified, converting the acquired destination telephone number into the destination country code based on the correspondence relationship between a telephone number pre-associated with the destination country code and the acquired destination telephone number; a database in which the destination country code is stored in association with guidance information in the language; selection means for selecting the guidance information associated with at least one of the origination country code acquired by the first acquisition means and the destination country code converted by the conversion means, from the database; and notification means for notifying the guidance information selected by the selection means to the terminal unit via the switchboard.

According to this configuration, if an originator inputs a destination telephone number with a normal origination operation at a terminal unit, an origination country code corresponding to the language understandable to the originator is sent to a switchboard together with a destination telephone number. Guidance information in the language corresponding to the origination country code is then notified to the origination terminal unit. At the same time, guidance information in the language understandable to the recipient which is associated with the destination telephone number via a destination country code is also notified to the destination terminal unit.

The communication network system according to claim 5 of the present invention is a communication network system provided with a guidance information notification apparatus for notifying guidance information to at least one of origination and destination terminal units having a telephone function via a switchboard; wherein the terminal unit comprises: storage means for storing an origination country code corresponding to the language understandable to the owner of the origination terminal unit and storing a destination country code corresponding to the language understandable to the owner of the destination terminal unit in association with a destination telephone number; and sending means for, when the destination telephone number is sent from the origination terminal unit, reading the destination country code associated with the destination telephone number and the origination country code from the storage means and sending the codes; and the guidance information notification apparatus comprises: acquisition means for acquiring at least one of the origination and destination country codes from the terminal unit via the switchboard; a database in which the origination and destination country codes are stored in association with guidance information in languages understandable to owners of the origination and destination terminal units, respectively; selection means for selecting the guidance information associated with at least one of the origination and destination country codes acquired by the acquisition means, from the database; and notification means for notifying the guidance information selected by the selection means to the terminal unit via the switchboard.

According to this configuration, if an originator inputs a destination telephone number with a normal origination operation at a terminal unit, an origination country code corresponding to the language understandable to the originator and a destination country code corresponding to the language understandable to the recipient are sent to a switchboard together with the destination telephone number. Guidance information in the language corresponding to the origination country code is then notified to the origination terminal unit. At the same time, guidance information in the language understandable to the recipient which is associated with the destination telephone number via the destination country code is also notified to the destination terminal unit.

The guidance information notification method according to claim 6 of the present invention is a guidance information notification method for notifying guidance information to at least one of origination and destination terminal units having a telephone function via a switchboard, in a communication network system; the guidance information notification method comprising: a first step of acquiring at least one of origination and destination telephone numbers from the switchboard; a second step of, with the use of a first country code with which at least one language used in a country or a country district can be identified, converting the acquired telephone number into the first country code based on the correspondence relationship between a telephone number pre-associated with the first country code and the telephone number acquired at the first step; a third step of selecting, from a database in which the first country code is stored in association with guidance information in the language, the guidance information associated with the first country code converted at the second step; and a fourth step of notifying the guidance information selected at the third step to the terminal unit via the switchboard.

According to this method, if an originator inputs a destination telephone number with a normal origination operation at a terminal unit, guidance information in the language understandable to the originator which is associated with the origination telephone number via a country code is notified to the origination terminal unit. At the same time, guidance information in the language understandable to the recipient which is associated with the destination telephone number via a country code is also notified to the destination terminal unit.

The guidance information notification method according to claim 7 of the present invention is a guidance information notification method for notifying guidance information to at least one of origination and destination terminal units having a telephone function via a switchboard, in a communication network system; the guidance information notification method comprising: a first step of acquiring at least one of origination and destination telephone numbers from the switchboard; a second step of, with the use of a second country code with which the language used in the area where a switchboard managing at least one of the origination and destination telephone numbers is installed can be identified, converting the telephone number acquired at the first step into the second country code based on the correspondence relationship between a telephone number pre-associated with the second country code and the acquired telephone number; a third step of selecting from a database in which the second country code is stored in association with guidance information in the language, the guidance information associated with the second country code converted at the second step; and a fourth step of notifying the guidance information selected at the third step to the terminal unit via the switchboard.

According to this method, if an originator inputs a destination telephone number with a normal origination operation at a terminal unit, guidance information in the language understandable to the originator which is associated with the origination telephone number via a country code is notified to the origination terminal unit. At the same time, guidance information in the language understandable to the recipient which is associated with the destination telephone number via a country code is also notified to the destination terminal unit.

The guidance information notification method according to claim 8 of the present invention is a guidance information notification method for notifying guidance information to at least one of origination and destination terminal units having a telephone function via a switchboard, in a communication network system; the guidance information notification method comprising: a first step of, when a destination telephone number is sent from the origination terminal unit, sending an origination country code corresponding to the language understandable to the owner of the origination terminal unit; a second step of acquiring the origination country code sent at the first step from the switchboard; a third step of acquiring the destination telephone number sent at the first step from the switchboard; a fourth step of, with the use of a destination country code with which at least one language used in a country or a country district can be identified, converting the destination telephone number acquired at the third step into the destination country code based on the correspondence relationship between a telephone number pre-associated with the destination country code and the acquired destination telephone number; a fifth step of selecting, from a database in which the destination country code is stored in association with guidance information in the language, the guidance information associated with at least one of the origination country code acquired at the first step and the destination country code converted at the fourth step; and a sixth step of notifying the guidance information selected at the fifth step to the terminal unit via the switchboard.

According to this configuration, if an originator inputs a destination telephone number with a normal origination operation at a terminal unit, an origination country code corresponding to the language understandable to the originator is sent to a switchboard together with a destination telephone number. Guidance information in the language corresponding to the origination country code is then notified to the origination terminal unit. At the same time, guidance information in the language understandable to the recipient which is associated with the destination telephone number via a destination country code is also notified to the destination terminal unit.

The guidance information notification method according to claim 9 of the present invention is a guidance information notification method for notifying guidance information to at least one of origination and destination terminal units having a telephone function via a switchboard, in a communication network system; the guidance information notification method comprising: a first step of, when a destination telephone number is sent from the origination terminal unit, reading from storage means for storing a destination country code corresponding to the language understandable to the owner of the destination terminal unit in association with the destination telephone number, the destination country code associated with the sent destination telephone number and sending the destination country code, as well as reading from storage means for storing an origination country code corresponding to the language understandable to the owner of the origination terminal unit, the origination country code and sending the origination country code; a second step of acquiring at least one of the origination and destination country codes from the origination terminal unit via the switchboard; a third step of selecting, from a database in which the origination and destination country codes are stored in association with guidance information in languages understandable to the owners of the origination and destination terminal units, respectively, the guidance information associated with at least one of the origination and destination country codes acquired at the second step; and a fourth step of notifying the guidance information selected at the third step to the terminal unit via the switchboard.

According to this method, if an originator inputs a destination telephone number with a normal origination operation at a terminal unit, an origination country code corresponding to the language understandable to the originator and a destination country code corresponding to the language understandable to the recipient are sent to a switchboard together with the destination telephone number. Guidance information in the language corresponding to the origination country code is then notified to the origination terminal unit. At the same time, guidance information in the language understandable to the recipient which is associated with the destination telephone number via the destination country code is also notified to the destination terminal unit.

DETAILED DESCRIPTION OF THE PREFERRED EMBODIMENTS

Description will be made on embodiments of the present invention below with reference to the drawings.

(First Embodiment)

Figure 1:
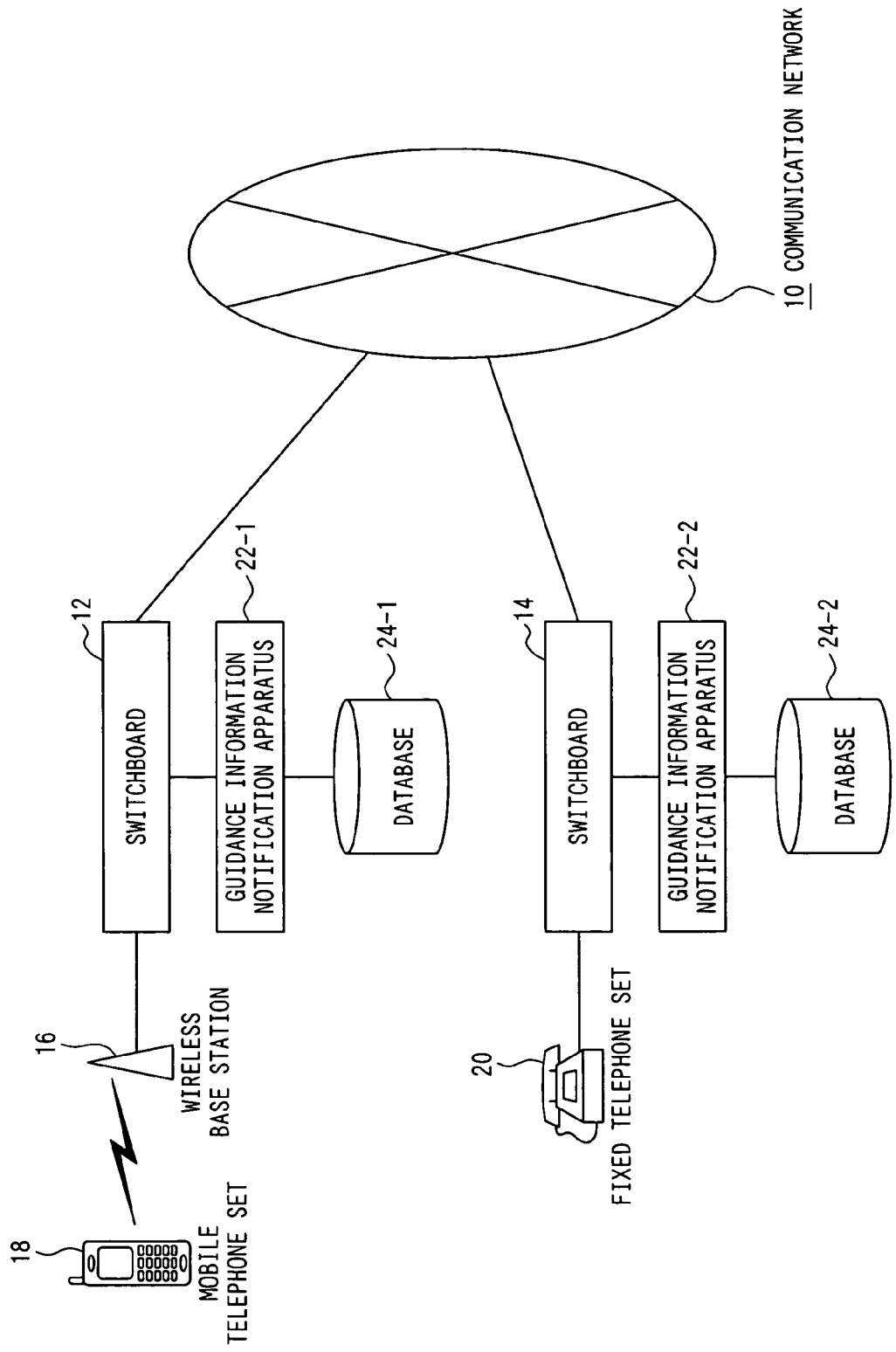
FIG. 1 shows a configuration of a communication network system to which a guidance information notification apparatus according to a first embodiment of the present invention is applied.

FIG. 1 shows a configuration of a communication network system to which a guidance information notification apparatus according to a first embodiment of the present invention is applied. The configuration of the communication network system is assumed to be similar to that shown in FIG. 1 through all the embodiments described later.

The communication network system shown in FIG. 1 is configured to include a communication network 10; a switchboard 12 in a mobile communication network system and a switchboard 14 in a general telephone network system which are connected to the communication network 10; a wireless base station 16 connected to the switchboard 12; a mobile telephone set 18 to be connected to the wireless base station 16 via a wireless line; and a fixed telephone set 20 connected to the switchboard 14.

The configuration of this embodiment is characterized in that guidance information notification apparatuses 22-1 and 22-2 are connected to the switchboards 12 and 14, respectively, in the communication network system. Furthermore, databases 24-1 and 24-2 which store guidance message information (guidance information) to be notified to the mobile telephone set 18 and the fixed telephone set 20 are connected to the guidance information notification apparatuses 22-1 and 22-2. Though the data bases 24-1 and 24-2 are provided externally to the guidance information notification apparatuses 22-1 and 22-2 in the figure, they may be provided inside the guidance information notification apparatuses 22-1 and 22-2. The guidance information notification apparatuses 22-1 and 22-2 may be provided externally or internally to the switchboards 12 and 14.

The guidance message information is information used for announcing predetermined guidance in a voice to the mobile telephone set 18 and the fixed telephone set 20, or information used for displaying predetermined guidance on a display with notation means such as letters and images. In this example, guidance message information is assumed to be information used for announcing predetermined guidance in a voice.

Though a combination of a mobile communication network system and a general telephone network system is used in this example, a combination of mobile communication network systems or a combination of general telephone network systems can also be realized. Each of the telephone sets 18 and 20 may be a terminal unit having a telephone function.

Figure 2:
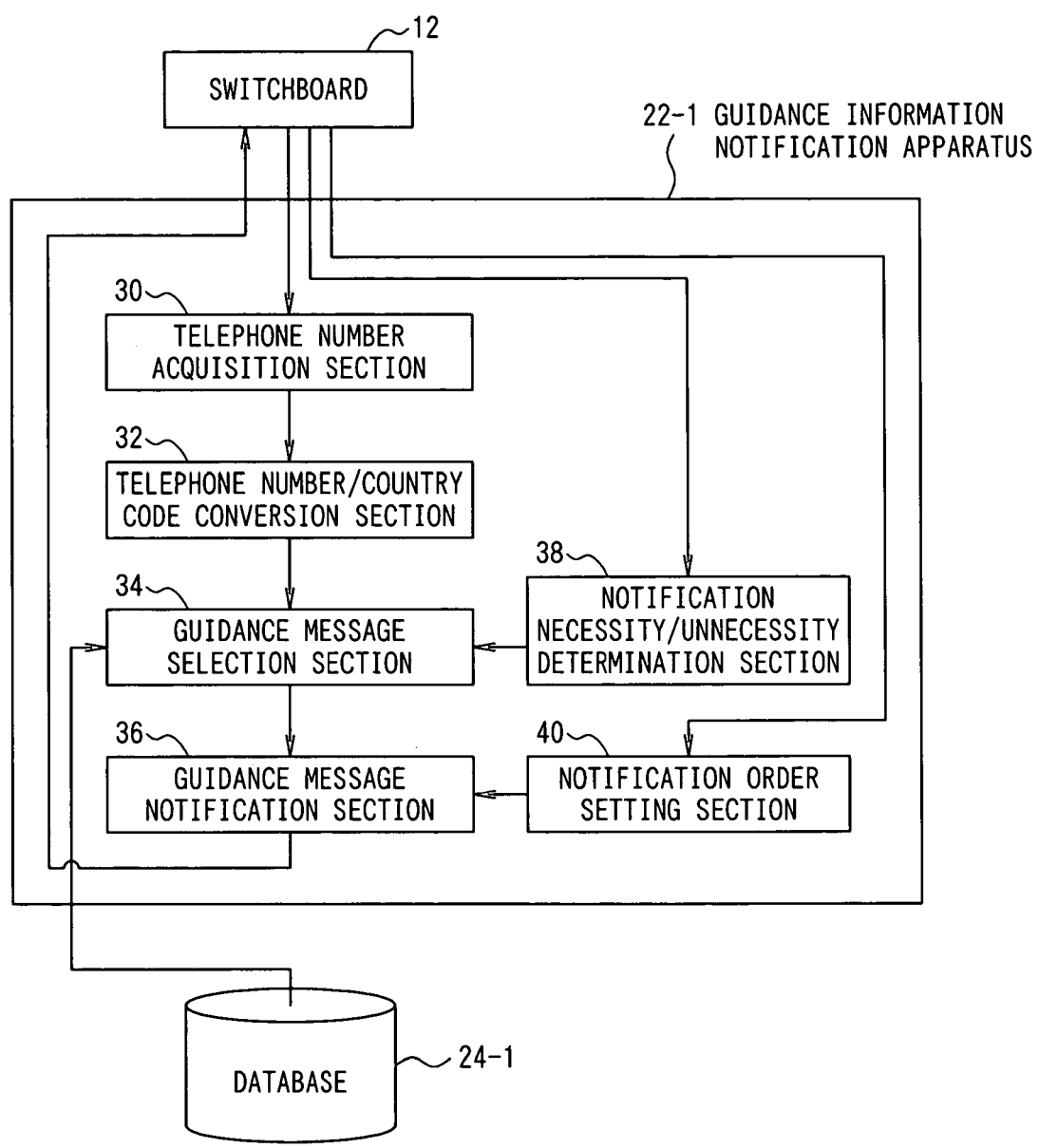
FIG. 2 is a block diagram showing the internal configuration of the guidance information notification apparatus according to the first embodiment.

The guidance information notification apparatuses 22-1 and 22-2 have the same configuration. As the guidance information notification apparatus 22-1 is in FIG. 2 representing the two, they are configured to include a telephone number acquisition section 30, a telephone number/country code conversion section 32, a guidance message selection section 34, a guidance message notification section 36, a notification necessity/unnecessity determination section 38 and notification order setting section 40.

Now, description will be made on these components.

The telephone number acquisition section 30 acquires an origination telephone number and a destination telephone number from the switchboard 12.

The telephone number/country code conversion section 32 converts a telephone number into a country code by selecting a country code pre-associated with the origination (or destination) telephone number acquired by the telephone number acquisition section 30. In this case, a country code is assumed to be a code with which at least one language used in a country or a country district can be identified, for, in some countries, different languages may be used in multiple districts, respectively. That is, some countries may have multiple different country codes.

The notification necessity/unnecessity determination section 38 determines whether a notification of guidance message information is necessary or unnecessary based on a notification necessity/unnecessity specification signal sent from the switchboard 12. The notification necessity/unnecessity specification signal is a signal indicating whether to notify guidance message information to the mobile telephone set 18 and is generally generated by the switchboard 12.

The database 24-1 stores a country code defined above in association with guidance message information in at least one language used in a country or a country district.

The guidance message selection section 34 selects guidance message information in the language corresponding to the country code obtained by the telephone number/country code conversion section 32, from guidance message information in languages used in various countries which is pre-stored in the database 24-1, when it is determined that notification of guidance message information is necessary (necessity of notification) by the notification necessity/unnecessity determination section 38. The guidance message selection section 34 does not perform the above selection when it is determined that notification of guidance message information is unnecessary (unnecessity of notification) by the notification necessity/unnecessity determination section 38.

The notification order setting section 40 retains a notification order direction signal sent from the switchboard 12 and sets the direction. The notification order direction signal is a signal to direct the order for notification of guidance message information and is sent from the switchboard 12 by a communication operator arbitrarily specifying the order to the switchboard 12 or by a user arbitrarily specifying the order to the switchboard 12 via the Internet and the like.

The guidance message notification section 36 notifies guidance message information in the language selected by the guidance message selection section 34 to the mobile telephone set 18 or the fixed telephone set 20 via the switchboard 12 in the notification order indicated by the notification order direction signal which is set for the notification order setting section 40.

Figure 3:
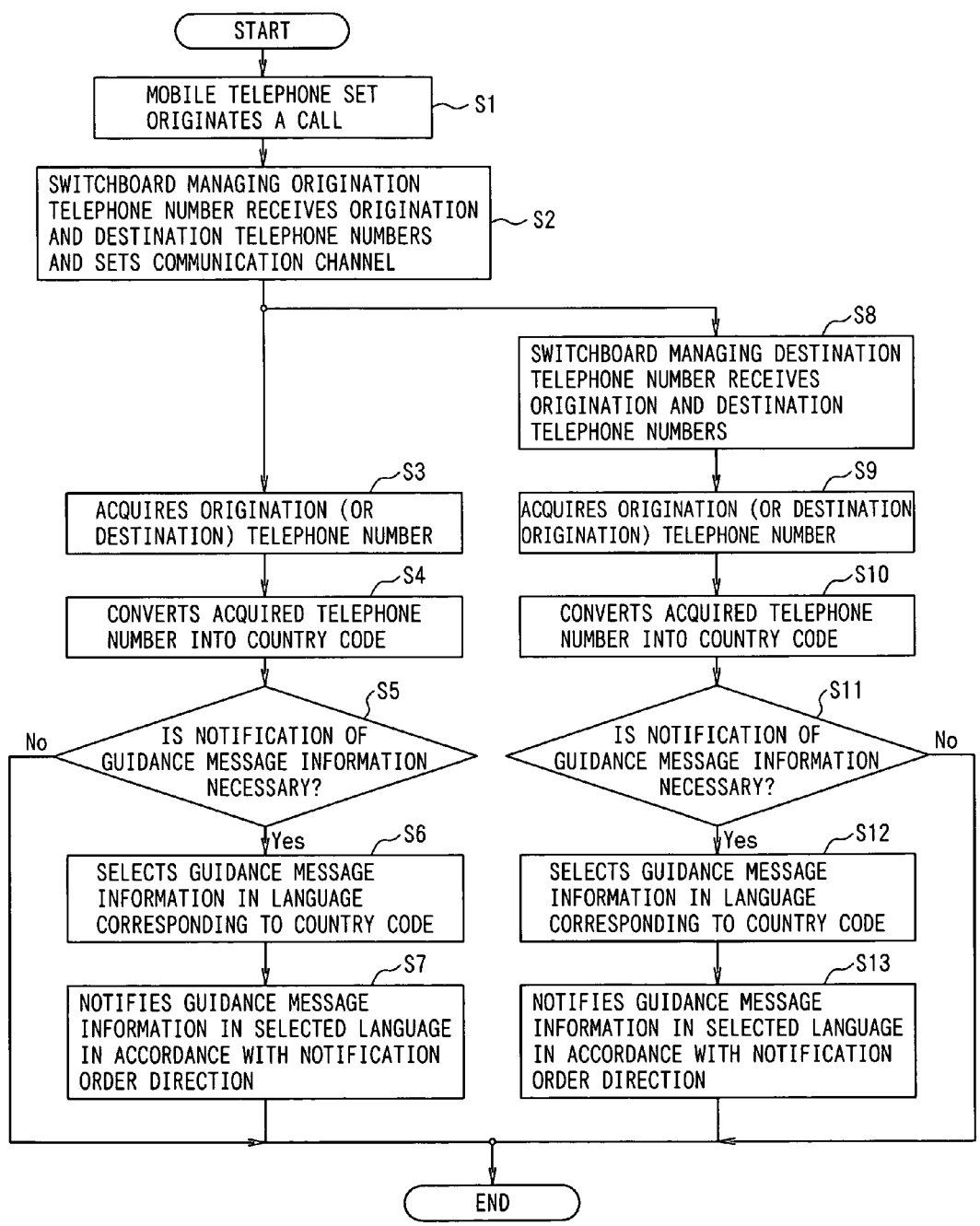
FIG. 3 is a flowchart for describing the operation of a guidance information notification process performed by the guidance information notification apparatus according to the first embodiment.

Description will be now made on a guidance information notification process to which the guidance information notification apparatuses 22-1 and 22-2 in a communication network system with such a configuration are applied, with reference to the flowchart shown in FIG. 3.

It is assumed that, at step S1, a user first keystrokes a desired destination telephone number to originate a call from the mobile telephone set 18. At step S2, the switchboard 12 which manages the telephone number of the mobile telephone set 18 then receives the origination and destination telephone numbers, and a communication channel is set based on both telephone numbers.

At step S3, the telephone number acquisition section 30 of the guidance information notification apparatus 22-1 connected to the switchboard 12 acquires the origination telephone number from both telephone numbers received by the switchboard 12. The acquired telephone number is outputted to the telephone number/country code conversion section 32. Then, at step S4, a country code (the country code of Japan, for example) pre-associated with the origination telephone number is selected by the telephone number/country code conversion section 32, and thereby the origination telephone number is converted into the country code of Japan.

At step S5, the notification necessity/unnecessity determination section 38 determines whether notification of guidance message information is necessary or unnecessary based on a notification necessity/unnecessity specification signal sent from the switchboard 12. As a result of the determination, if notification is unnecessary, the guidance information notification process ends.

On the contrary, if notification is necessary, then at step S6, the guidance message selection section 34 selects Japanese guidance message information which corresponds to the country code of Japan, from among guidance message information in languages used in various countries which is pre-stored in the database 24-1.

The selected Japanese guidance message information is notified to the mobile telephone set 18 via the switchboard 12, in accordance with the notification order direction set for the notification order setting section 40 at step S7. Thereby, predetermined Japanese guidance is announced to the mobile telephone set 18.

After a communication channel is set by the switchboard 12 at step S2 described above, the switchboard 14 which manages the telephone number of the fixed telephone set 20 of the destination, receives the origination and destination telephone numbers at step S8.

After that, at step S9, the telephone number acquisition section 30 of the guidance information notification apparatus 22-2 connected to the switchboard 14 acquires the destination telephone number from both telephone numbers received by the switchboard 14. The acquired telephone number is outputted to the telephone number/country code conversion section 32. Then, at step S10, a country code (the country code of the United States, for example) pre-associated with the destination telephone number is selected by the telephone number/country code conversion section 32, and thereby the destination telephone number is converted into the code of the United States.

At step S11, the notification necessity/unnecessity determination section 38 determines whether notification of guidance message information is necessary or unnecessary based on a notification necessity/unnecessity specification signal sent from the switchboard 14. As a result of the determination, if notification is unnecessary, the guidance information notification process ends.

On the contrary, if notification is necessary, then at step S12, the guidance message selection section 34 selects English guidance message information which corresponds to the country code of the United States, from among guidance message information in languages used in various countries which is pre-stored in the database 24-2.

The selected English guidance message information is notified to the mobile telephone set 18 via the switchboard 14, in accordance with the notification order direction set for the notification order setting section 40 at step S13. Thereby, predetermined English guidance is announced to the mobile telephone set 18.

In addition, a case is supposed here where the switchboard 12 is installed in Japan and the switchboard 14 is installed in the United States, and an American who visits Japan for sightseeing makes a call with his/her mobile telephone set 18 in Japan to the fixed telephone set 20 in the United States.

In this case, at the above step S3, the telephone number acquisition section 30 of the guidance information notification apparatus 22-1 connected to the switchboard 12 acquires the destination telephone number from both telephone numbers received by the switchboard 12. The acquired telephone number is outputted to the telephone number/country code conversion section 32. Then, at the above step S4, the code of the United States pre-associated with the destination telephone number is selected by the telephone number/country code conversion section 32, and thereby the destination telephone number is converted into the code of the United States.

At the above step S5, the notification necessity/unnecessity determination section 38 determines whether notification of guidance message information is necessary or unnecessary based on a notification necessity/unnecessity specification signal sent from the switchboard 12. As a result of the determination, if notification is unnecessary, the guidance information notification process ends.

On the contrary, if notification is necessary, then at the above step S6, the guidance message selection section 34 selects English guidance message information which corresponds to the country code of the United States, from among guidance message information in languages used in various countries which is pre-stored in the database 24-1.

The selected English guidance message information is notified to the mobile telephone set 18 via the switchboard 12, in accordance with the notification order direction set for the notification order setting section 40 at the above step S7. Thereby, predetermined English guidance is announced to the mobile telephone set 18.

At the above step S9, the telephone number acquisition section 30 of the guidance information notification apparatus 22-2 connected to the switchboard 14 acquires the origination telephone number from both telephone numbers received by the switchboard 14. The acquired telephone number is outputted to the telephone number/country code conversion section 32. Then, at the above step S10, the code of the United States pre-associated with the origination telephone number is selected by the telephone number/country code conversion section 32, and thereby the origination telephone number is converted into the code of the United States.

Through the processing from the above steps S11 to S13, predetermined English guidance is announced to the mobile telephone set 18 via the switchboard 14.

As described above, according to the guidance message information notification apparatus in a communication network system, according to the first embodiment, if an originator inputs a destination telephone number with a normal origination operation at the mobile telephone set 18, guidance message information in the language understandable to the originator which is associated with the origination telephone number via a country code is notified to the origination mobile telephone set 18.

Thus, by dispensing with a particular operation other than a normal origination operation required when a user obtains a notification of a guidance message in an understandable language such as a native language, with the mobile telephone set 18 or the fixed telephone set 20, convenience to a user can be improved.

The guidance information notification apparatuses 22-1 and 22-2 receive information which directs processing of guidance message information via the switchboards 12 and 14, respectively, set the direction, and notify guidance message information to the mobile telephone set 18 or the fixed telephone set 20, in response to the set direction. Accordingly, if a communication operator sends information which directs processing of guidance message information to the switchboard 12 or 14, the guidance message information can be notified to the mobile telephone set 18 or the fixed telephone set 20 while the processing is performed in accordance with the direction. Therefore, it is possible for the user to receive support from the communication operator of his contract network when a roaming service is provided, which improves convenience to the user.

The direction described above may be sent to the switchboard 12 or 14 not only by a communication operator but also by a user via the Internet. In this case, it is also possible for the user to preset the order of notification of guidance message information and the like so that he can easily recognize guidance message, which improves convenience to the user.

(Second Embodiment)

Though the guidance information notification apparatus in a communication network system according to a second embodiment has a configuration similar to that of the guidance information notification apparatus according to the first embodiment shown in FIG. 2, the definition of a country code used for conversion by the telephone number/country code conversion section 32 and the contents to be stored by the data bases 24-1 and 24-2 are different.

That is, in the second embodiment, the country code is a code with which the language used in the area where the switchboard 12 or 14 managing the telephone number of the originating or destination telephone set 18 or 20 is installed, can be identified.

In the data bases 24-1 and 24-2, the country code defined in the second embodiment is stored in association with guidance message information in the language used in the area where the switchboards 12 and 14 managing the telephone number of the origination or destination telephone sets 18 and 20 are installed, respectively.

Accordingly, the guidance information notification process performed by the guidance information notification apparatus having such a configuration according to the second embodiment, is similar to the guidance information notification process shown in FIG. 3 which has been referred to in the description of the first embodiment, and the advantages similar to those of the first embodiment can be obtained.

(Third Embodiment)

Figure 4:
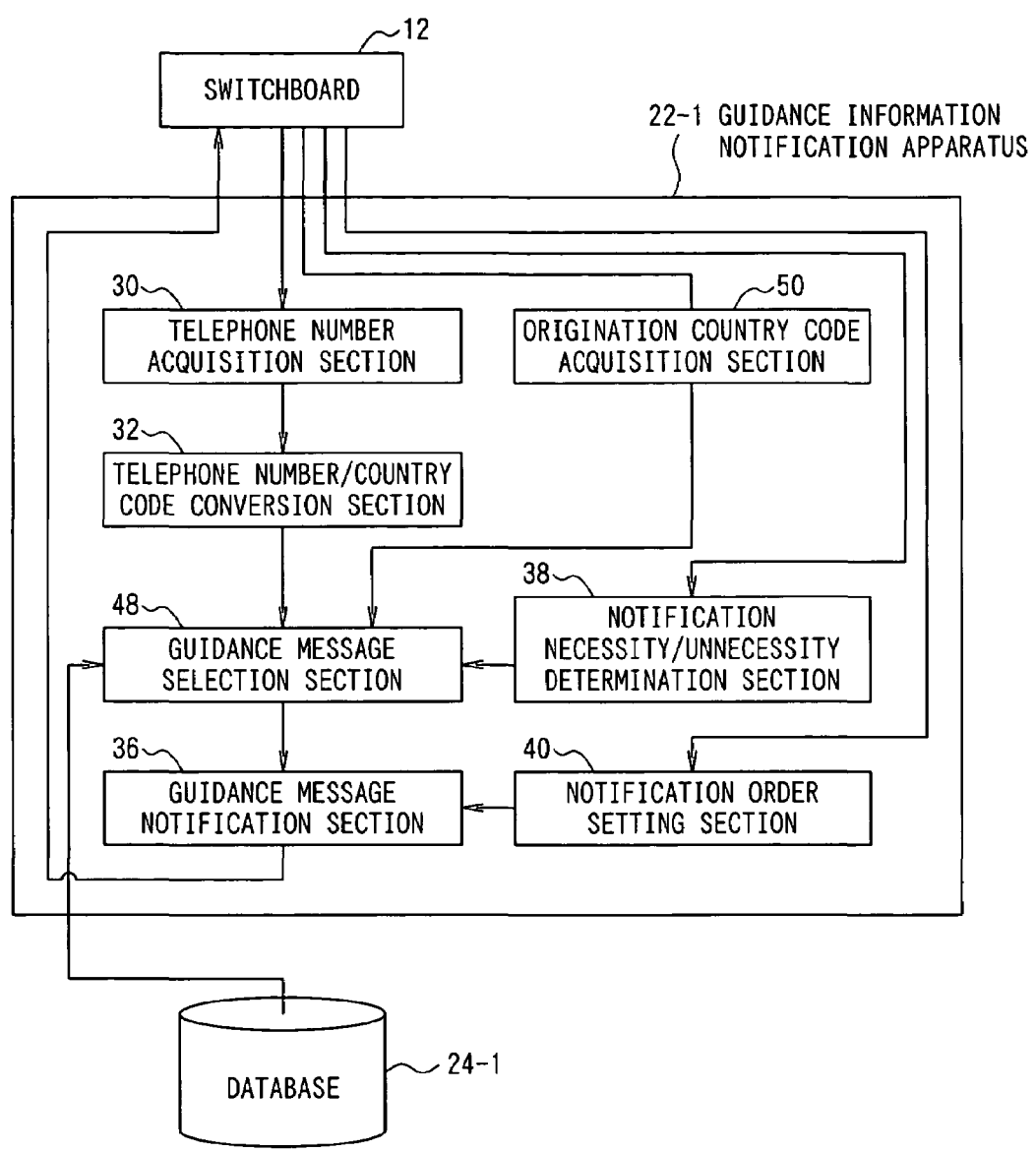
FIG. 4 is a block diagram of a guidance information notification apparatus which is a component of a communication network system according to a third embodiment of the present invention.
Figure 5:
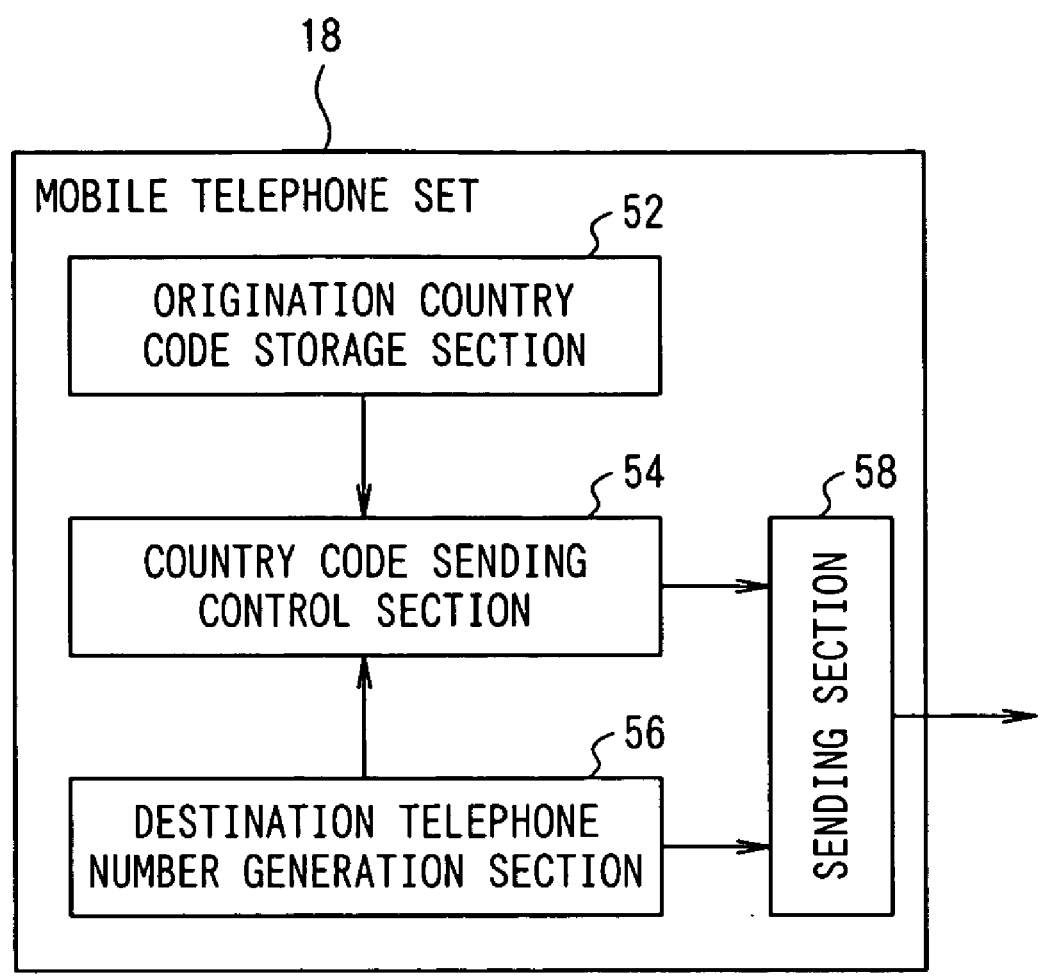
FIG. 5 is a block diagram of a mobile telephone set which is a component of a communication network system according to a third embodiment of the present invention.

FIG. 4 is a block diagram of a guidance information notification apparatus which is a component of a communication network system according to a third embodiment of the present invention. FIG. 5 is a block diagram of a mobile telephone set which is a component of a communication network system according to a third embodiment of the present invention. However, since the guidance information notification apparatuses 22-1 and 22-2 shown in FIG. 1 have the same configuration, only the guidance information notification apparatus 22-1 is shown. The fixed telephone set 20 and the mobile telephone set 18 have also the same characteristic configuration, and therefore only the mobile telephone set 18 is shown.

The mobile telephone set 18 shown in FIG. 5 is configured to include an origination country code storage section 52, a country code sending control section 54, a destination telephone number generation section 56 and a sending section 58.

The origination country code storage section 52 stores an origination country code corresponding to the native language of a user who owns the origination telephone set 18. An origination country code corresponding to any language understandable to the user may be stored instead of one corresponding to the native language.

When a user inputs a destination telephone number with keys, the destination telephone number generation section 56 generates, the destination telephone number.

When the destination telephone number is generated by the destination telephone number generation section 56, the country code sending control section 54 controls the sending section 58 to send the origination country code stored in the origination country code storage section 52.

The sending section 58 sends the destination telephone number generated by the destination telephone number generation section 56 and also sends the origination country code in response to control by the country code sending control section 54.

The guidance information notification apparatus 22-1 shown in FIG. 4 is configured to include a telephone number acquisition section 30, a telephone number/country code conversion section 32, a guidance message selection section 48, an origination country code acquisition section 50, a guidance message notification section 36, a notification necessity/unnecessity determination section 38 and a notification order setting section 40. Description on the sections similar to those of the guidance information notification apparatus 22-1 shown in FIG. 2 is omitted.

The origination country code acquisition section 50 receives an origination country code sent from the mobile telephone set 18 via the switchboard 12.

When necessity of notification is determined by the notification necessity/unnecessity determination section 38, the guidance message selection section 48 selects guidance message information in the language corresponding to each of the origination country code received by the origination country code acquisition section 50 or a country code obtained by the telephone number/country code conversion section 32, from among guidance message information in languages used in various countries which is pre-stored in the database 24-1.

Figure 6:
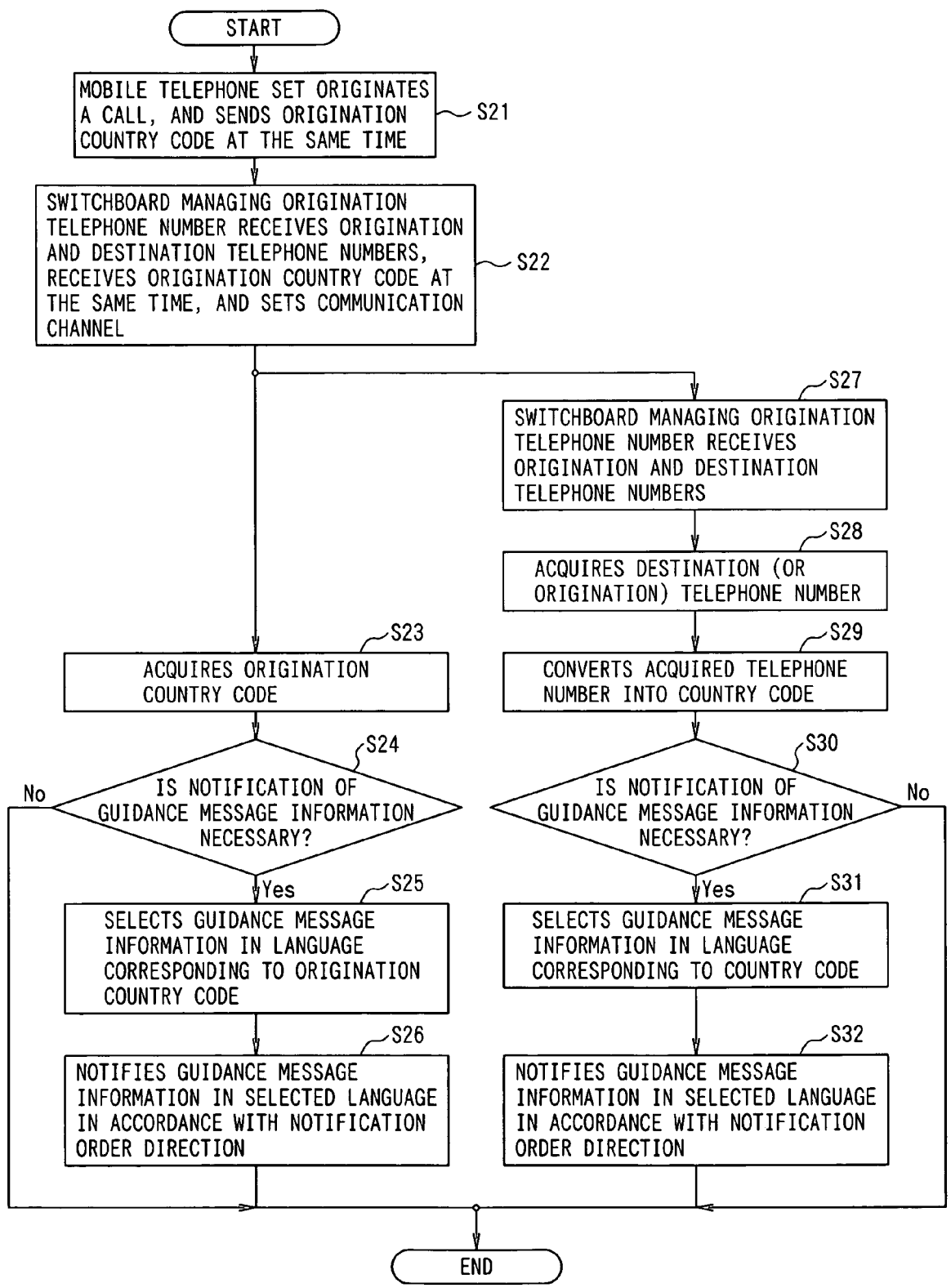
FIG. 6 is a flowchart for describing the operation of a guidance information notification process performed by the communication network system according to the third embodiment.

Description will be now made on a guidance information notification process in a communication network system to which the telephone sets 18 and 20 and the guidance information notification apparatuses 22-1 and 22-2 having such configurations are applied, with reference to the flowchart shown in FIG. 6.

At step S21, when a user first inputs a desired destination telephone number with keys from the mobile telephone set 18, the destination telephone number generation section 56 generates the destination telephone number and the sending section 58 sends it to the switchboard 12. The country code sending control section 54 controls the sending section 58 to send the origination country code stored in the origination country code storage section 52 to the switchboard 12 then.

At step S22, the switchboard 12 which manages the telephone number of the mobile telephone set 18 then receives the origination and destination telephone numbers, and a communication channel is set based on both telephone numbers. The origination country code is also received.

At step S23, the origination country code acquisition section 50 of the guidance information notification apparatus 22-1 connected to the switchboard 12 acquires the origination country code from the switchboard 12.

At step S24, the notification necessity/unnecessity determination section 38 determines whether notification of guidance message information is necessary or unnecessary based on a notification necessity/unnecessity specification signal sent from the switchboard 12. As a result of the determination, if notification is unnecessary, the guidance information notification process ends.

On the contrary, if notification is necessary, then at step S25, the guidance message selection section 48 selects guidance message information which is associated with the origination country code, from among guidance message information in languages used in various countries which is pre-stored in the database 24-1.

The selected guidance message information is notified to the mobile telephone set 18 via the switchboard 12, in accordance with the notification order direction set for the notification order setting section 40, at step S26. Thereby, predetermined guidance in the language understandable to the user is announced to the mobile telephone set 18.

After a communication channel is set by the switchboard 12 at step S22 described above, the switchboard 14 which manages the telephone number of the fixed telephone set 20 of the destination receives the origination and destination telephone numbers at step S27.

After that, at step S28, the telephone number acquisition section 30 of the guidance information notification apparatuses 22-2 connected to the switchboard 14 acquires the destination telephone number from the switchboard 14. The acquired destination telephone number is outputted to the telephone number/country code conversion section 32. Then at step 29, a destination country code pre-associated with the destination telephone number is selected by the telephone number/country code conversion section 32, and thereby the destination telephone number is converted into the destination country code.

At step S30, the notification necessity/unnecessity determination section 38 determines whether notification of guidance message information is necessary or unnecessary based on a notification necessity/unnecessity specification signal sent from the switchboard 14. As a result of the determination, if notification is unnecessary, the guidance information notification process ends.

On the contrary, if notification is necessary, then at step S31, the guidance message selection section 48 selects guidance message information in the language corresponding to the destination country code, from among guidance message information in languages used in various countries which is pre-stored in the database 24-2.

The selected guidance message information is notified to the mobile telephone set 18 via the switchboard 14, in accordance with the notification order direction set for the notification order setting section 40, at step S32. Thereby, predetermined guidance in the language understandable to the user is announced to the mobile telephone set 18.

In addition, at step S28, if the telephone number acquisition section 30 of the guidance information notification apparatus 22-2 connected to the switchboard 14 acquires the origination telephone number from the switchboard 14, the following process is performed.

The acquired origination telephone number is outputted to the telephone number/country code conversion section 32. Then at the above step 29, an origination country code pre-associated with the origination telephone number is selected by the telephone number/country code conversion section 32, and thereby the origination telephone number is converted into the origination country code.

At the above step S30, the notification necessity/unnecessity determination section 38 determines whether notification of guidance message information is necessary or unnecessary based on a notification necessity/unnecessity specification signal sent from the switchboard 14. As a result of the determination, if notification is unnecessary, the guidance information notification process ends.

On the contrary, if notification is necessary, then at the above step S31, the guidance message selection section 48 selects guidance message information in the language corresponding to the origination country code, from among guidance message information in languages used in various countries which is pre-stored in the database 24-2.

The selected guidance message information is notified to the mobile telephone set 18 via the switchboard 14, in accordance with the notification order direction set for the notification order setting section 40, at the above step S32. Thereby, predetermined guidance in the language understandable to the user is announced to the mobile telephone set 18.

Thus, in the communication network system according to the third embodiment, if an originator inputs a destination telephone number with a normal origination operation at the mobile telephone set 18, an origination country code corresponding to the language understandable to the originator is sent to the guidance information notification apparatus 22-1 via the switchboard 12 together with the destination telephone number. Guidance information in the language corresponding to the origination country code is then notified by the guidance information notification apparatus 22-1 to the mobile telephone set 18.

Thus, by dispensing with a particular operation other than a normal origination operation required when a user obtains a notification of a guidance message in an understandable language such as a native language, with the mobile telephone set 18 or the fixed telephone set 20, convenience to a user can be improved.

The guidance information notification apparatuses 22-1 and 22-2 receive information which directs processing of guidance message information via the switchboards 12 and 14, respectively, set the direction, and notify guidance message information to the mobile telephone set 18 or the fixed telephone set 20, in response to the set direction. Accordingly, if a communication operator sends information which directs processing of guidance message information to the switchboard 12 or 14, the guidance message information can be notified to the mobile telephone set 18 or the fixed telephone set 20 while the processing is performed in accordance with the direction. Therefore, it is possible for the user to receive support from the communication operator of his contract network when a roaming service is provided, which improves convenience to the user.

The direction described above may be sent to the switchboard 12 or 14 not only by a communication operator but also by a user via the Internet. In this case, it is also possible for the user to preset the order of notification of guidance message information and the like so that he can easily recognize guidance message, which improves convenience to the user.

(Fourth Embodiment)

Figure 7:
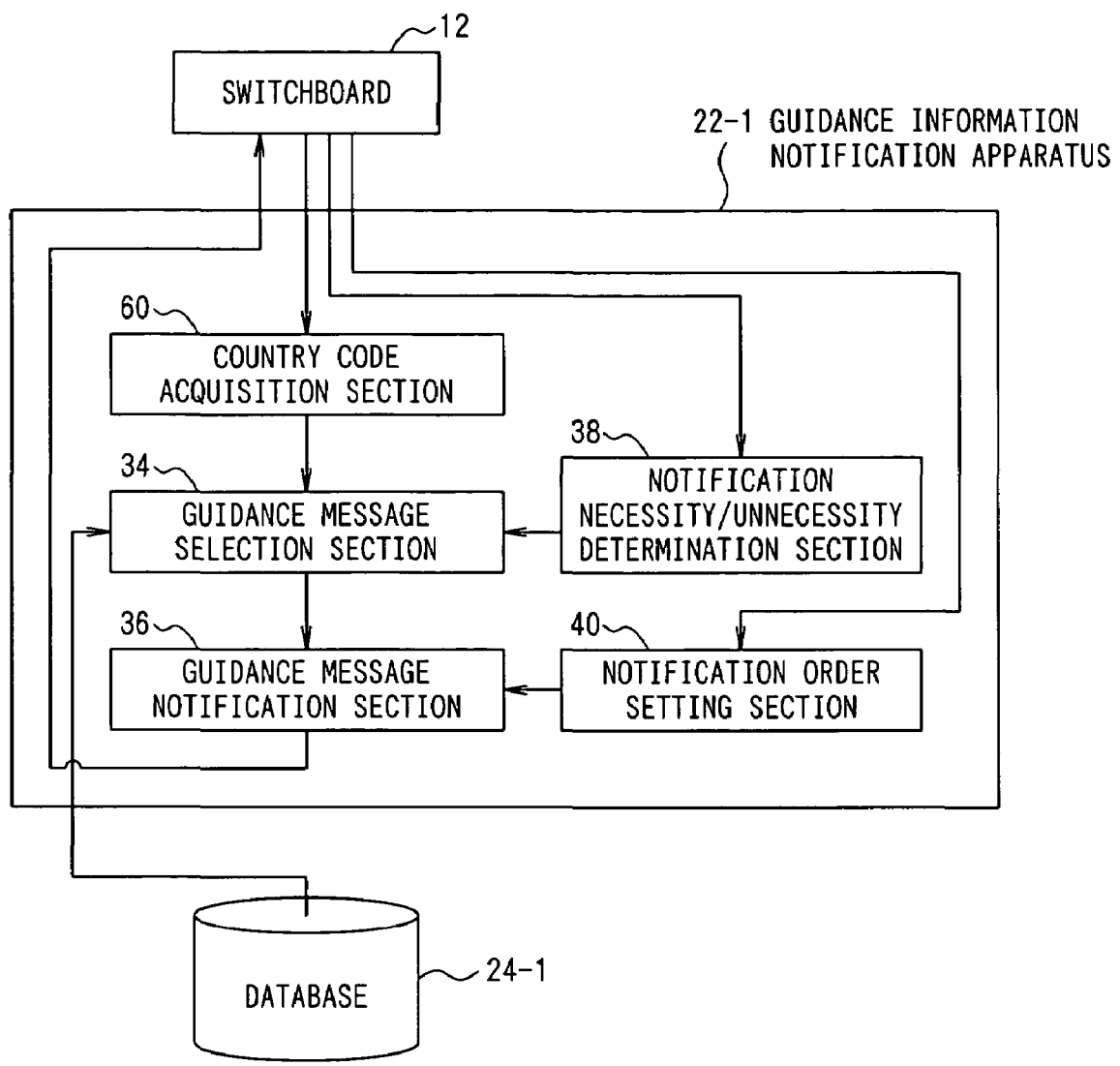
FIG. 7 is a block diagram of a guidance information notification apparatus which is a component of a communication network system according to a fourth embodiment of the present invention.
Figure 8:
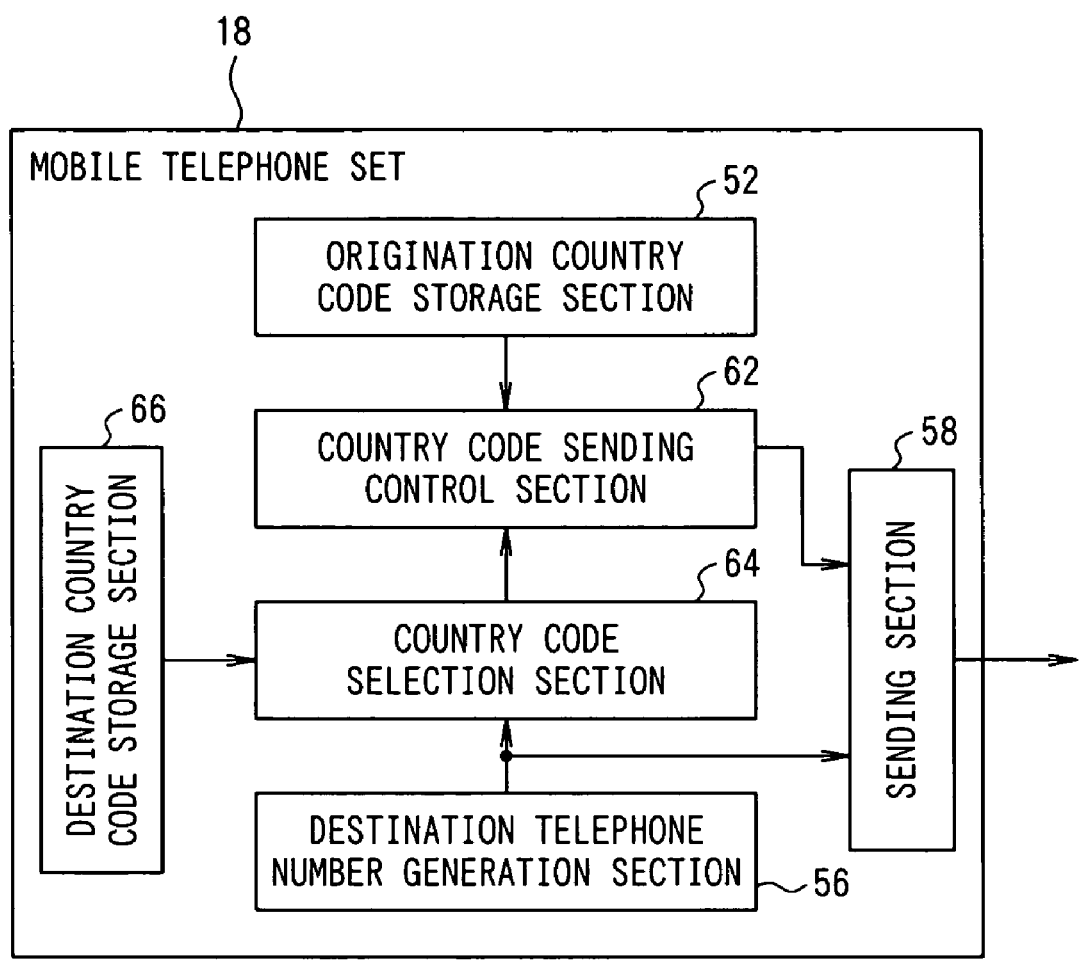
FIG. 8 is a block diagram of a guidance information notification apparatus which is a component of the communication network system according to the fourth embodiment of the present invention.

FIG. 7 is a block diagram of a guidance information notification apparatus which is a component of a communication network system according to a fourth embodiment of the present invention. FIG. 8 is a block diagram of a mobile telephone set which is a component of a communication network system according to the fourth embodiment of the present invention. In FIG. 7, the sections corresponding to the sections described above in FIG. 4 are indicated by the same symbols, and in FIG. 8, the sections corresponding to the sections described above in FIG. 2 are indicated by the same symbols. Description on such sections is omitted.

The mobile telephone set 18 shown in FIG. 8 is configured to include a country code sending control section 62, a country code selection section 64, a destination country code storage section 66, an origination country code storage section 52, a destination telephone number generation section 56 and a sending section 58.

The destination country code storage section 66 stores the destination country code corresponding to the native language of a user who owns the destination fixed telephone set 20. A destination country code corresponding to any language understandable to the user may be stored instead of one corresponding to the native language. A lot of destination country codes are stored.

When a destination telephone number is generated by the destination telephone number generation section 56, the country code selection section 64 selects a destination country code associated with the destination telephone number from the destination country code storage section 66.

The country code sending control section 62 controls the sending section 58 to send the destination country code selected by the country code selection section 64 and the origination country code stored in the origination country code storage section 52.

The guidance information notification apparatus 22-1 shown in FIG. 7 is configured to include a country code acquisition section 60, a guidance message selection section 34, a guidance message notification section 36, a notification necessity/unnecessity determination section 38 and a notification order setting section 40.

The country code acquisition section 60 receives an origination or destination country code sent from the mobile telephone set 18 via the switchboard 12 and outputs it to the guidance message selection section 34.

Figure 9:
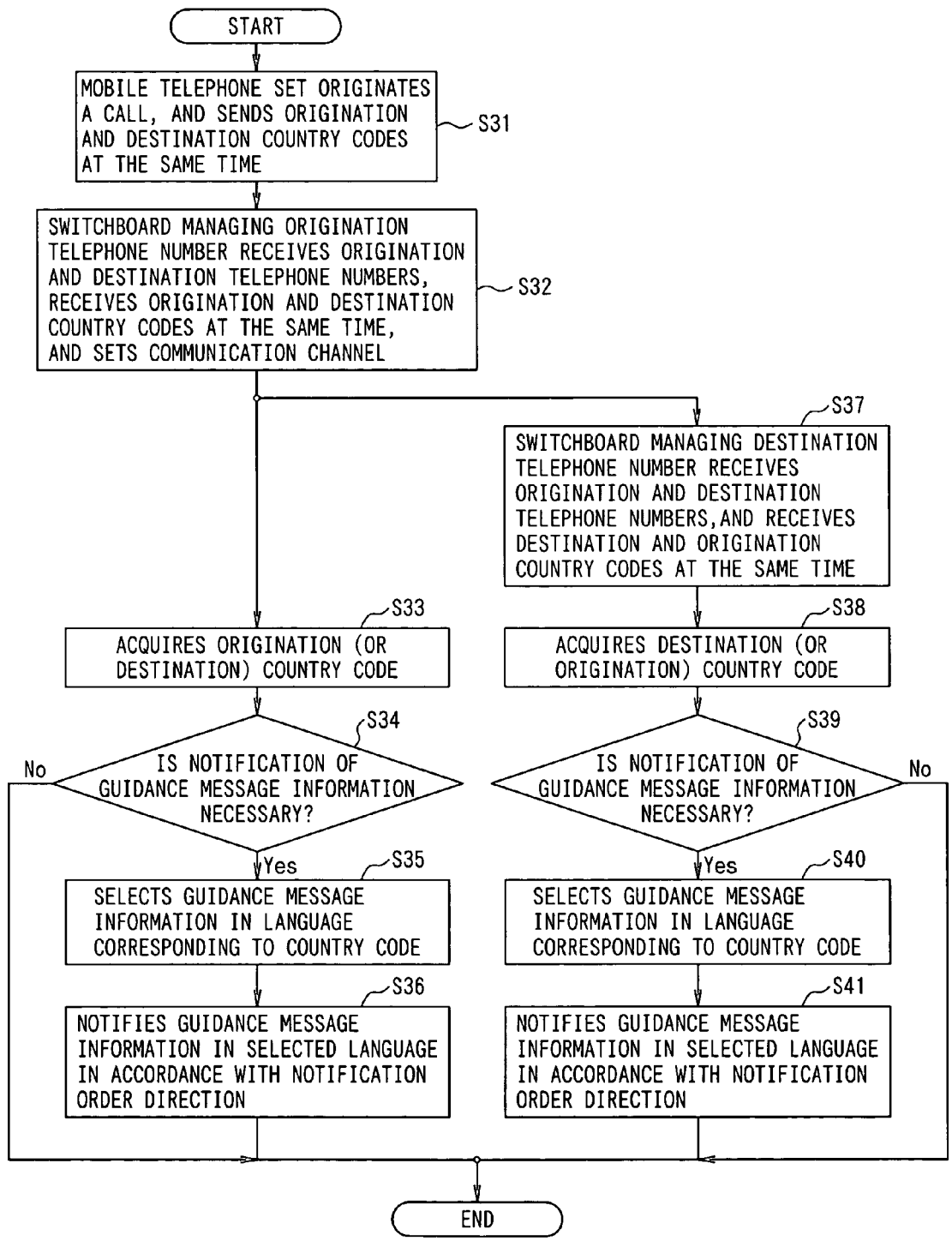
FIG. 9 is a flowchart for describing the operation of a guidance information notification process performed by the communication network system according to the fourth embodiment.

Description will be now made on a guidance information notification process in a communication network system to which the telephone sets 18 and 20 and the guidance information notification apparatuses 22-1 and 22-2 having such configurations are applied, with reference to the flowchart shown in FIG. 9.

At step S31, when a user first inputs a desired destination telephone number with keys from the mobile telephone set 18, the destination telephone number generation section 56 generates the destination telephone number and the sending section 58 sends it to the switchboard 12. The country code selection section 64 selects a destination country code associated with the destination telephone number from the destination country code storage section 66 then. The country code sending control section 62 then controls the sending section 58 to send the selected destination country code and the origination country code stored in the origination country code storage section 52 to the switchboard 12.

At step S32, the switchboard 12 which manages the telephone number of the mobile telephone set 18 then receives the origination and destination telephone numbers, and a communication channel is set based on both telephone numbers. The origination and destination country codes are also received.

At step S33, the country code acquisition section 60 of the guidance information notification apparatus 22-1 connected to the switchboard 12 acquires the origination country code from the switchboard 12.

At step S34, the notification necessity/unnecessity determination section 38 determines whether notification of guidance message information is necessary or unnecessary based on a notification necessity/unnecessity specification signal sent from the switchboard 12. As a result of the determination, if notification is unnecessary, the guidance information notification process ends.

On the contrary, if notification is necessary, then at step S35, the guidance message selection section 34 selects guidance message information which is associated with the origination country code, from among guidance message information in languages used in various countries which is pre-stored in the database 24-1.

The selected guidance message information is notified to the mobile telephone set 18 via the switchboard 12, in accordance with the notification order direction set for the notification order setting section 40, at step S36. Thereby, predetermined guidance in the language understandable to the user is announced to the mobile telephone set 18.

After a communication channel is set by the switchboard 12 at step S32 described above, the switchboard 14 which manages the telephone number of the fixed telephone set 20 of the destination receives the origination and destination telephone numbers at step S37. The destination country code is also received at the same time.

After that, at step S38, the country code acquisition section 60 of the guidance information notification apparatus 22-2 connected to the switchboard 14 acquires the destination country code from the switchboard 14.

At step S39, the notification necessity/unnecessity determination section 38 determines whether notification of guidance message information is necessary or unnecessary based on a notification necessity/unnecessity specification signal sent from the switchboard 14. As a result of the determination, if notification is unnecessary, the guidance information notification process ends.

On the contrary, if notification is necessary, then at step S40, the guidance message selection section 34 selects guidance message information in the language corresponding to the destination country code, from among guidance message information in languages used in various countries which is pre-stored in the database 24-2.

The selected guidance message information is notified to the mobile telephone set 18 via the switchboard 14, in accordance with the notification order direction set for the notification order setting section 40, at step S41. Thereby, predetermined guidance in the language understandable to the user is announced to the mobile telephone set 18.

In addition, at step S33, if the country code acquisition section 60 of the guidance information notification apparatus 22-1 connected to the switchboard 12 acquires the destination country code from the switchboard 12, the following process is performed.

At the above step S34, the notification necessity/unnecessity determination section 38 determines whether notification of guidance message information is necessary or unnecessary based on a notification necessity/unnecessity specification signal sent from the switchboard 12. As a result of the determination, if notification is unnecessary, the guidance information notification process ends.

On the contrary, if notification is necessary, then at the above step S35, the guidance message selection section 34 selects guidance message information which corresponds to the destination country code, from among guidance message information in languages used in various countries which is pre-stored in the database 24-1.

The selected guidance message information is notified to the mobile telephone set 18 via the switchboard 12, in accordance with the notification order direction set for the notification order setting section 40, at the above step S36. Thereby, predetermined guidance in the language understandable to the user is announced to the mobile telephone set 18.

At the above step S38, the country code acquisition section 60 of the guidance information notification apparatus 22-2 connected to the switchboard 14 acquires the origination country code from the switchboard 14.

At the above step S39, the notification necessity/unnecessity determination section 38 determines whether notification of guidance message information is necessary or unnecessary based on a notification necessity/unnecessity specification signal sent from the switchboard 14. As a result of the determination, if notification is unnecessary, the guidance information notification process ends.

On the contrary, if notification is necessary, then at the above step S40, the guidance message selection section 34 selects guidance message information in the language corresponding to the origination country code, from among guidance message information in languages used in various countries which is pre-stored in the database 24-2.

The selected guidance message information is notified to the mobile telephone set 18 via the switchboard 14, in accordance with the notification order direction set for the notification order setting section 40, at the above step S41. Thereby, predetermined guidance in the language understandable to the user is announced to the mobile telephone set 18.

Thus, according to the communication network system according to the fourth embodiment, if an originator inputs a destination telephone number with a normal origination operation at the mobile telephone set 18, an origination country code corresponding to the language understandable to the originator is sent to the switchboard 12 and a destination country code corresponding to the language understandable to the recipient is sent to the switchboard 14, together with the destination telephone number. Guidance information in the language corresponding to the origination country code is then notified to the origination mobile telephone set 18. At the same time, guidance information in the language understandable to the recipient having the destination fixed telephone set 20 is notified to the destination terminal unit.

Thus, by dispensing with a particular operation other than a normal origination operation required when a user obtains a notification of a guidance message in an understandable language such as a native language, with the mobile telephone set 18 or the fixed telephone set 20, convenience to a user can be improved.

Similar to the third embodiment described above, it is possible for the user to receive support from the communication operator of his contract network when a roaming service is provided, which improves convenience to the user.

Furthermore, it is also possible for the user to preset the order of notification of guidance message information and the like so that he can easily recognize guidance message, which improves convenience to the user.

As described above, according to the guidance information notification system and the guidance information notification method in the communication network system of the present invention, if an originator inputs a destination telephone number with a normal origination operation at a terminal unit, guidance information in the language understandable to the originator which is associated with the origination telephone number via a country code is notified to the origination terminal unit. At the same time, guidance information in the language understandable to the recipient which is associated with the destination telephone number via a country code is also notified to the destination terminal unit. Thus, by dispensing with a particular operation other than a normal origination operation required when a user obtains a notification of a guidance message in an understandable language such as a native language, with a terminal unit, convenience to a user can be advantageously improved.

Furthermore, information for directing processing of guidance information is received via a switchboard and set, and guidance information is notified to a terminal unit in response to the set direction. Accordingly, if a communication operator sends the information for directing processing of guidance information to the switchboard, guidance information can be notified to a terminal unit while the processing in accordance with the direction is performed. Therefore, it is possible for the user to receive support from the communication operator of his contract network when a roaming service is provided, which advantageously improves convenience to the user.

What is claimed is:

1. A communication network system provided with a guidance notification apparatus for notifying guidance information to at least one of origination and destination terminal units having a telephone function via a switchboard; wherein the origination terminal unit comprises:
storage means for storing a first country code corresponding to the language understandable to the owner of the origination terminal unit; and
sending means for sending the first country code stored in the storage means when a destination telephone number is sent from the origination terminal unit; and the guidance information notification apparatus comprises:
first acquisition means for acquiring a first country code from the origination terminal unit via the switchboard;
second acquisition means for acquiring a telephone number from the switchboard;
conversion means for, with the use of the first country code with which at least one language used in a country or a country district can be identified, converting the acquired telephone number into the first country code based on the correspondence relationship between a telephone number pre-associated with the first country code and the telephone number acquired by the second acquisition means;
a database in which the first country code is stored in association with guidance information in the language;
selection means for selecting the guidance information associated with the first country code which has been converted by the conversion means, from the database;
notification means for notifying the guidance information selected by the selection means to the terminal unit via the switchboard;
notification necessity/unnecessity determination means determines whether a notification of guidance information is necessary or unnecessary based on a notification necessity/unnecessity specification signal generated by the switchboard and sent from the switchboard; and,
notification order setting means to direct the order for notification of guidance information based on the notification order direction signal sent from switchboard by a direction from a communication operator or user when it is determined that notification of guidance information is necessary.

2. A communication network system provided with a guidance notification apparatus for notifying guidance information to at least one of origination and destination terminal units having a telephone function via a switchboard; wherein the origination terminal unit comprises:
storage means for storing a first country code corresponding to the language understandable to the owner of the origination terminal unit; and
sending means for sending the first country code stored in the storage means when a destination telephone number is sent from the origination terminal unit; and the guidance information notification apparatus comprises:
first acquisition means for acquiring a first country code from the origination terminal unit via the switchboard;
second acquisition means for acquiring a telephone number from the switchboard;
conversion means for, with the use of a second country code with which the language used in an area where a switchboard managing at least one of the origination and destination telephone numbers is installed can be identified, converting the acquired telephone number into the second country code based on the correspondence relationship between a telephone number pre-associated with the second country code and the telephone number acquired by the second acquisition mean;
a database in which the first country code and second country code are stored in association with guidance information in the language;
selection means for selecting the guidance information associated with the second country code which has been converted by the conversion means, from the database;
notification means for notifying the guidance information selected by the selection means to the terminal unit via the switchboard;
notification necessity/unnecessity determination means determines whether a notification of guidance information is necessary or unnecessary based on a notification necessity/unnecessity specification signal generated by the switchboard and sent from itself; and,
notification order setting means to direct the order for notification of guidance information based on notification order direction signal sent from switchboard by a direction from a communication operator or user when it is determined that notification of guidance information is necessary.

3. A communication network system, according to claim 1 or 2, the guidance information apparatus further comprising:
    setting means for causing information which directs processing of the guidance information to be set via the switchboard;
    wherein the notification means notifies the guidance information selected by the selection means to the terminal unit in response to the direction set by the setting means.

4. A communication network system provided with a guidance information notification apparatus for notifying guidance information to at least one of origination and destination terminal units having a telephone function via a switchboard;
    wherein
    the origination terminal unit comprises:
    storage means for storing an origination country code corresponding to the language understandable to the owner of the origination terminal unit; and
    sending means for sending the origination country code stored in the storage means when a destination telephone number is sent from the origination terminal unit; and
    the guidance information notification apparatus comprises:
    first acquisition means for acquiring the origination country code from the origination terminal unit via the switchboard;
    second acquisition means for acquiring the destination telephone number from the switchboard;
    conversion means for, with the use of a destination country code with which at least one language used in a country or a country district can be identified, converting the acquired destination telephone number into the destination country code based on the correspondence relationship between a telephone number pre-associated with the destination country code and the acquired destination telephone number;
    a database in which the destination country code is stored in association with guidance information in the language;
    selection means for selecting the guidance information associated with at least one of the origination country code acquired by the first acquisition means and the destination country code converted by the conversion means, from the database;
    notification means for notifying the guidance information selected by the selection means to the terminal unit via the switchboard;
    notification necessity/unnecessity determination means determines whether a notification of guidance information is necessary or unnecessary based on a notification necessity/unnecessity specification signal generated by the switchboard and send from itself; and,
    notification order setting means to direct the order for notification of guidance information based on notification order direction signal sent from switchboard by a direction from a communication operator or user when it is determined that notification of guidance information is necessary.

5. A communication network system provided with a guidance information notification apparatus for notifying guidance information to at least one of origination and destination terminal units having a telephone function via a switchboard,
    wherein
    the origination terminal unit comprises:
    storage means for storing an origination country code corresponding to the language understandable to the owner of the origination terminal unit and storing a destination country code corresponding to the language understandable to the owner of the destination terminal unit in association with a destination telephone number; and
    sending means for, when the destination telephone number is sent from the origination terminal unit, reading the destination country code associated with the destination telephone number and the origination country code from the storage means and sending the codes; and
    the guidance information notification apparatus comprises:
    acquisition means for acquiring at least one of the origination and destination country codes from the terminal unit via the switchboard;
    a database in which the origination and destination country codes are stored in association with guidance information in languages understandable to owners of the origination and destination terminal units, respectively;
    selection means for selecting the guidance information associated with at least one of the origination and destination country codes acquired by the acquisition means, from the database;
    notification means for notifying the guidance information selected by the selection means to the terminal unit via the switchboard;
    notification necessity/unnecessity determination means determines whether a notification of guidance information is necessary or unnecessary based on a notification necessity/unnecessity specification signal generated by the switchboard and sent from itself; and,
    notification order setting means to direct the order for notification of guidance information based on notification order direction signal sent from switchboard by a direction from a communication operator or user when it is determined that notification of guidance information is necessary.

6. A communication method for notifying guidance information to at least one of origination and destination terminal units having a telephone function via a switchboard, in a communication network system, the communication method comprising:
    a first step of storing an origination country code corresponding to the language understandable to the owner of the origination terminal unit;
    a second step of sending the origination country code corresponding to the language understandable to the owner of the origination terminal unit;
    a third step of acquiring at least one of origination and destination telephone numbers from the switchboard;
    a fourth step of, with the use of a first country code with which at least one language used in a country or a country district can be identified, converting the acquired telephone number into the first country code based on the correspondence relationship between a telephone number pre-associated with the first country code and the telephone number acquired at the third step;

a fifth step of selecting, from a database in which the first country code is stored in association with guidance information in the language, the guidance information associated with the first country code converted at the fourth step;

a sixth step of notifying the guidance information selected at the fifth step to the terminal unit via the switchboard;

a seventh step of determining whether a notification of guidance information is necessary or unnecessary based on a notification necessity/unnecessity specification signal generated by the switchboard and sent from itself; and, a eighth step of directing the order for notification of guidance information based on notification order direction signal sent from switchboard by a direction from a communication operator or user when it is determined that notification of guidance information is necessary.

7. A communication method for notifying guidance information to at least one of origination and destination terminal units having a telephone function via a switchboard, in a communication network system, the communication method comprising:

a first step of storing an origination country code corresponding to the language understandable to the owner of the origination terminal unit;

a second step of sending the origination country code corresponding to the language understandable to the owner of the origination terminal unit;

a third step of acquiring at least one of origination and destination telephone numbers from the switchboard;

a fourth step of, with the use of a second country code with which the language used in the area where a switchboard managing at least one of the origination and destination telephone numbers is installed can be identified, converting the telephone number acquired at the third step into the second country code based on the correspondence relationship between a telephone number pre-associated with the second country code and the acquired telephone number;

a fifth step of selecting from a database in which the origination country code and second country code stored in association with guidance information in the language, the guidance information associated with the second country code converted at the fourth step;

a sixth step of notifying the guidance information selected at the fifth step to the terminal unit via the switchboard;

a seventh step of determining whether a notification of guidance information is necessary or unnecessary based on a notification necessity/unnecessity specification signal generated by the switchboard and sent from itself; and a eighth step of directing the order for notification of guidance information based on notification order direction signal sent from switchboard by a direction from a communication operator or user when it is determined that notification of guidance information is necessary.

8. A communication method for notifying guidance information to at least one of origination and destination terminal units having a telephone function via a switchboard, in a communication network system, the communication method comprising:

a first step of storing an origination country code corresponding to the language understandable to the owner of the origination terminal unit;

a second step of sending the origination country code corresponding to the language understandable to the owner of the origination terminal unit;

a third step of, when a destination telephone number is sent from the origination terminal unit, sending an origination country code corresponding to the language understandable to the owner of the origination terminal unit;

a fourth step of acquiring the origination country code sent at the third step from the switchboard;

a fifth step of acquiring the destination telephone number sent at the third step from the switchboard;

a sixth step of, with the use of a destination country code with which at least one language used in a country or a country district can be identified, converting the destination telephone number acquired at the fifth step into the destination country code based on the correspondence relationship between a telephone number pre-associated with the destination country code and the acquired destination telephone number;

a seventh step of selecting, from a database in which the destination country code is stored in association with guidance information in the language, the guidance information associated with at least one of the origination country code acquired at the third step and the destination country code converted at the sixth step; and a eight step of notifying the guidance information selected at the seventh step to the terminal unit via the switchboard;

a ninth step of determining whether a notification of guidance information is necessary or unnecessary based on a notification necessity/unnecessity specification signal generated by the switchboard and sent from itself; and, a tenth step of directing the order for notification of guidance information based on notification order direction signal sent from switchboard by a direction from a communication operator or user when it is determined that notification of guidance information is necessary.

9. A communication method for notifying guidance information to at least one of origination and destination terminal units having a telephone function via a switchboard, in the communication network system, the communication method comprising:

a first step of storing an origination country code corresponding to the language understandable to the owner of the origination terminal unit;

a second step of sending the origination country code corresponding to the language understandable to the owner of the origination terminal unit;

a third step of, when a destination telephone number is sent from the origination terminal unit, reading from storage means for storing a destination country code corresponding to the language understandable to the owner of the destination terminal unit in association with the destination telephone number, the destination country code associated with the sent destination telephone number and sending the destination country code, as well as reading from storage means for storing an origination country code corresponding to the language understandable to the owner of the origination terminal unit, the origination country code and sending the origination country code;

a fourth step of acquiring at least one of the origination and destination country codes from the origination terminal unit via the switchboard;

a fifth step of selecting, from a database in which the origination and destination country codes are stored in association with guidance information in languages understandable to the owners of the origination and destination terminal units, respectively, the guidance information associated with at least one of the origination and destination country codes acquired at the fourth step;

a sixth step of notifying the guidance information selected at the fifth step to the terminal unit via the switchboard;

a seventh step of determining whether a notification of guidance information is necessary or unnecessary based on a notification necessity/unnecessity specification signal generated by the switchboard and sent from itself; and, a eighth step of directing the order for notification of guidance information based on notification order direction signal sent from switchboard by a direction from a communication operator or user when it is determined that notification of guidance information is necessary.

* * * * *